United States Patent [19]

Asakura

[11] Patent Number: 4,642,657

[45] Date of Patent: Feb. 10, 1987

[54] RECORDER

[75] Inventor: Osamu Asakura, Tokyo, Japan

[73] Assignee: Canon Kabushiki Kaisha, Tokyo, Japan

[21] Appl. No.: 716,385

[22] Filed: Mar. 27, 1985

[30] Foreign Application Priority Data

Apr. 4, 1984 [JP] Japan .................................. 59-67043

[51] Int. Cl.⁴ .......................................... G01D 15/10
[52] U.S. Cl. ................................ 346/76 PH; 400/120
[58] Field of Search ............... 346/76 PH, 76 R, 154; 214/216 PH, 497; 400/120; 250/317.1, 318, 319

[56] References Cited

U.S. PATENT DOCUMENTS 4,361,844 11/1982 Nozaki et al. .................. 346/76 PH
4,409,600 10/1983 Minowa ......................... 346/76 PH Primary Examiner—Arthur G. Evans
Attorney, Agent, or Firm—Fitzpatrick, Cella, Harper & Scinto

[57] ABSTRACT

A recorder comprises a recording head having recording elements, a power supply for supplying a power to the recording head, a cable for electrically connecting the recording head to the power supply to supply the power of the power supply to the recording head, and a voltage regulator for detecting a voltage actually applied to the recording elements to regulate the voltage applied to the recording elements.

7 Claims, 3 Drawing Figures

RECORDER

BACKGROUND OF THE INVENTION

1. Field of the Invention

The present invention relates to a recorder which turns on and off power from a power supply to record on a record medium by recording elements.

2. Description of the Prior Art

In a prior art recorder such as a thermal head driver of a thermal printer, a carrier (or a thermal head) is moved relative to a main body of the recorder. Therefore, flexible wires for controlling drive of heat generating elements must be connected between a power supply and a central processing unit (controller or CPU) on a stationary unit and the carrier.

The heat generating elements are driven by the power supply, the CPU, a shift register (temporary memory) and a driver which drives the heat generating elements in accordance with a pattern signal from the shift register and controlled by a constant voltage for regulating a supply voltage from the power supply at a constant level.

FIG. 1 shows a circuit configuration of a prior art thermal head driver.

In FIG. 1, a CPU 1, a shift register 2 and a driver 3 which is switching means to energize and deenergize heat generating elements 12 are located on a stationary unit. The shift register 2 is controlled by a print data signal 4, a print command signal 5 and a timing signal 6 from the CPU 1 and the driver 3 is controlled in accordance with a pattern signal 7 from the shift register. On the other hand, a power line 9 from a positive power supply 8 is connected to the heat generating elements 12 (only three of those are shown although 12 to 24 elements are usually provided) on a thermal head on a moving unit through a constant voltage circuit 10, and negative power lines 13 connected to the heat generating elements 12 are connected to a negative power supply 14.

The positive power line 9 and as many negative power lines as the number of heat generating elements 12 are accommodated in a flexible cable 15.

In operation, data signals 4 serially sent from the CPU 1 are sequentially loaded to the shift register 2 which controls the driver 3 in a serial-in, parallel-out fashion to print a desired pattern. In this manner, the data are printed by repeating the pattern printing.

In such a prior art thermal head driver, if the power lines 9 and 13 in the relatively long flexible cable 15 have resistances, voltage drops occur because of relatively high currents flowing therethrough and the voltage drops vary by the change in the number of dots (the number of heat generating elements) to be driven. As a result, the supply voltages to the heat generating elements 12 vary depending on the number of dots and the densities are not uniform. When the number of heat generating elements 12 is 24, a current in the order of 100mA, for example, flows per heat generating element and the power supply voltages when all of the 24 dots are printed and those when one dot is printed are significantly different if the power lines include the resistances. Thus, the print densities are not uniform.

In the prior art recorder, in order to keep the voltages constant independently from the number of dots, large diameter power lines 9 and 13 (or wide lines when a flexible printed circuit lines are used) are utilized to minimize the voltage drops.

However, when the large diameter power lines 9 and 13 are used, the diameter of the flexible cable 15 increases and it occupies more space. In addition, the flexible cable becomes less flexible reliability is lowered and manufacturing cost increases.

SUMMARY OF THE INVENTION

It is an object of the present invention to provide a recorder which drives recording elements with a constant power irrespective of a drive state of the recording elements to enable stable recording.

It is another object of the present invention to provide a recorder which does not impart a heavy burden to a cable and can make a high quality record.

The other objects of the present invention will be apparent from the following description of the invention.

DETAILED DESCRIPTION OF THE PREFERRED EMBODIMENTS

Figure 1:
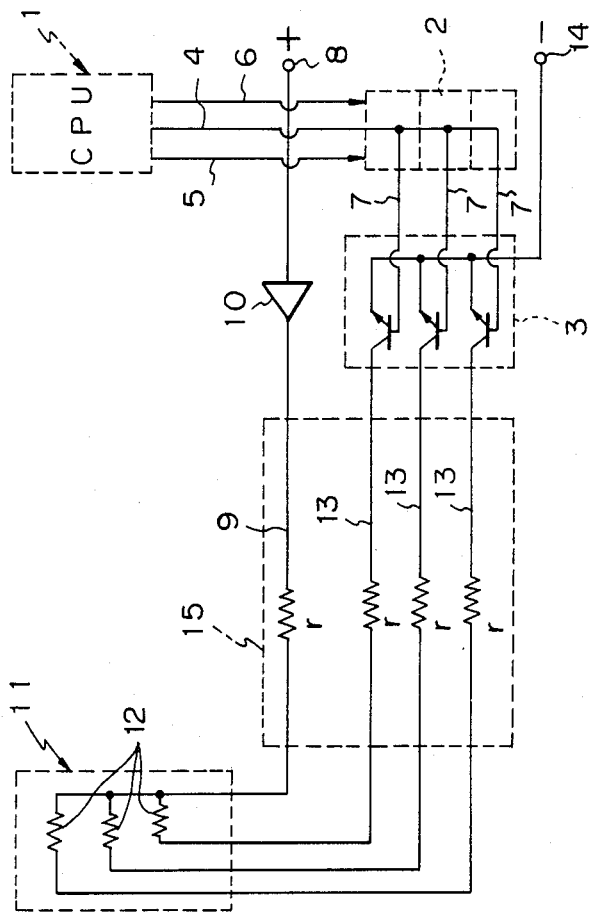
FIG. 1 shows a circuit configuration of a prior art thermal head driver.
Figure 2:
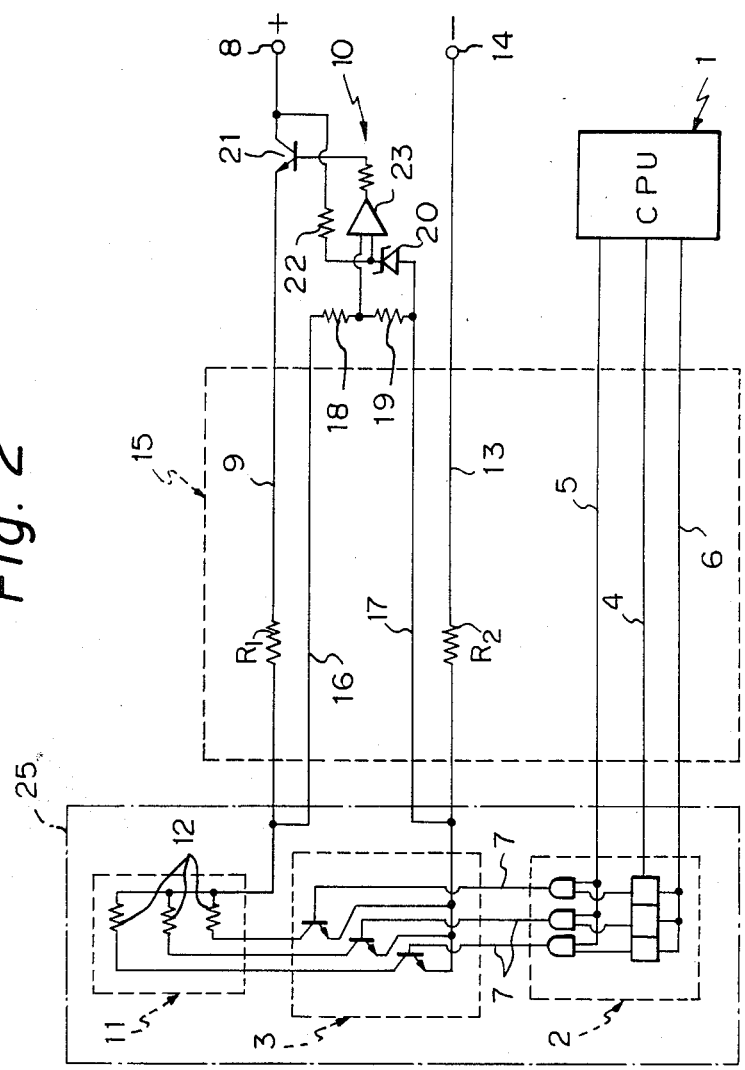
FIG. 2 shows a circuit configuration of one embodiment of a thermal head driver of the present invention.

Referring to FIG. 2, one embodiment of the present invention is explained. The like elements to those shown in FIG. 1 are designated by like numerals.

The CPU 1 is located on the stationary unit such as the main body of the recorder, and the thermal head 11 which is the recording head, the shift register 2 and the driver 3 are located on the carrier 25 which is the moving unit. The flexible cable 15 which includes connecting wires extends between the stationary unit and the moving unit.

The flexible cable 15 includes seven wires, the print data signal line 4 extending between the CPU 1 and the shift register 2, the print command signal line 5, the timing (clock) signal line 6, the positive power line 9, the negative power line 13, a positive voltage detection signal line 16 and a negative voltage detection signal line 17.

The data signals from the CPU 1 are serially supplied to the shift register 2 through the line 4 and temporarily stored therein, and then sent to the driver 3 in serial-in, parallel-out fashion through the pattern signal line 7 in response to the print command signal 5.

On the other hand, the voltage regulator 10 which regulates the voltage to be applied to the heat generating elements 12 is connected to the positive power supply 8, the positive power line 9 from the voltage regulator 10 is connected to the heat generating elements 12 of the thermal head 11, the negative power lines from the heat generating elements 12 are connected to the driver 3, and the negative power lines from the driver 3 are merged to the single line 13 which is connected to the negative power supply 14 through the flexible cable 15.

Switching elements for driving the heat generating elements 12 of the driver 3 are controlled by the signals on the corresponding pattern signal line 7 so that desired heat generating elements 12 are driven to print desired dots.

While only three heat generating elements 12 are shown in FIG. 2 for simplicity, 12 to 24 such heat generating elements are usually provided depending on the number of dots.

The positive and negative voltage detection signal line 16 and 17 are connected to the positive and negative power lines 9 and 13, respectively, on a carrier 25, that is, in the vicinity of the heat generating elements 12 and the driver 3 and detect the voltages at those positions. Those voltage detection signals are supplied to the voltage regulator 10 which regulates the power supply voltages such that a voltage difference is kept constant. Accordingly, the voltage supplied to the heat generating elements 12 is always kept constant.

The voltage regulator 10 is located on the stationary unit and may be configured as shown in FIG. 2. It comprises voltage dividing resistors 18 and 19 which equally divide the voltage across the positive and negative power lines, a zener diode 20 which generates a constant voltage thereacross, a voltage regulating transistor 21 connected to the positive power line 9, a circuit which supplies the voltage across the zener diode 20 to a collector of the transistor 21 through a current limiting resistor 22, and a differential amplifier (operational amplifier) 23 which compares the voltage across the voltage dividing resistor with the constant voltage across the zener diode 20 and produces a signal for correcting a difference therebetween to supply a control current to a base of the transistor 21.

In the embodiment shown in FIG. 2, since the driver 3 is located on the carrier (moving unit), the power lines in the flexible cable 15 need only two lines 9 and 13 one for each of the positive and negative lines and hence the flexible cable 15 may be of small diameter (or narrow). Since the voltages are detected in the vicinities of the input and output ports of the power lines 9 and 13 to the heat generating elements 12 and the driver 3 on the carrier (moving unit) and the power supply voltage is regulated based on the detection voltages, the voltage supplied to the heat generating elements 12 is always kept constant independently from the changes in the voltage drops across the resistances $R_1$ and $R_2$ of the power lines 9 and 13, that is, independently from the number of dots. Accordingly, even if the power lines 9 and 13 are of small diameter (narrow), the supply voltage is kept constant and the non-uniformity in the print densities due to the change in the number of dots is eliminated.

Since the negative power line 13 is single, even if the power line 13 is of large diameter (wide) to reduce the voltage drop, it does not lead to substantial increase of the space occupied by and the inflexibility of the flexible cable 15. In this case, the voltage detection may be effected only for the positive power line 9 and the voltage detection for the negative power line may be omitted to keep the supply voltage to the heat generating elements 12 constant. Where two voltage detection signal lines 16 and 17 are provided as shown, the negative power line 13 may be of small diameter.

Since only small currents flow through the signal lines 16, 17, 5, 4 and 6 for voltage detection print command, print data and timing, unlike the power lines 9 and 13, there are no voltage drops thereacross and those lines may be of small diameter (or narrow).

Thus, the number of lines and the diameters (widths) of the lines can be reduced and hence the diameter (width) of the flexible cable 15 can be reduced (or narrow) and the space factor is improved, the flexibility is improved and the cost is reduced. Accordingly, the thermal head driver which keeps the drive voltage constant and assures uniform print density is obtained.

While the shift register 2 is located on the moving unit in the embodiment of FIG. 2, it may be located on the stationary unit. In this case, the flexible cable 15 includes a plurality of pattern signal lines 7 instead of the signal lines 4, 5 and 6. Even in this case, the same advantages as those described above are attained.

Since the shift register 2 and the driver 3 on the moving unit (carrier) are constructed by IC's, they may be mounted on the thermal head 11. Thus, the construction is simpler than when they are mounted on the carrier.

Figure 3:
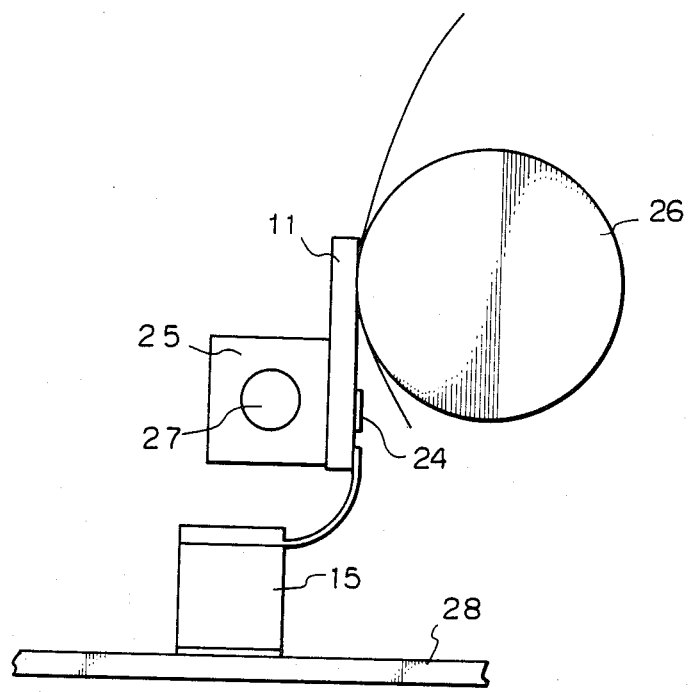
FIG. 3 shows a construction of the present embodiment.

FIG. 3 shows a mechanical construction of the thermal head driver of the present invention. In the present embodiment, an IC 24 which includes the shift register 2 and the driver 3 is fixed on a substrate of the thermal head 11. The carrier 25 moves along a guide shaft 27 which is parallel to a platen 26. Connecting terminals on the carrier 25 are connected to a printed circuit board 28 on the stationary unit of the recorder through the flexible cable 15. Mounted on the printed circuit board 28 are the CPU 1, voltage regulator 10, and power supply terminals 8 and 14.

The present invention is not limited to the illustrated embodiments but it may be applied to other recorders than the thermal printer such as thermal jet printer and wire dot printer.

In the above embodiments, the voltages are detected to regulate the voltage to be applied to the heat generating elements. Alternatively, a pulse width to be applied to the heat generating element may be controlled to supply the constant voltage.

What is claimed is:

1. A recorder comprising:
   recording means having a recording element for recording on a recording medium;
   power source means for providing electrical energy;
   drive means for enabling electrical energy from said power source to energize said recording element in accordance with a signal;
   a carrier movable relative to said power source means and having said recording means and said drive means mounted thereon;
   electrical connection means connected at a first end thereof to said power source means and at a second end thereof to said recording means for supplying electrical energy provided by said power source means to said recording element when said recording element is enabled by said drive means; and
   regulation means for detecting the voltage proximate to said second end of said electrical connection means and for regulating the electrical energy supplied to said first end of said electrical connection means based on the detection.

2. A recorder according to claim 1, wherein said regulation means detects the voltage across said recording element and said drive means to regulate the voltage applied to said recording element.

3. A recorder according to claim 1, wherein said regulation means detects the voltage across said recording element and said drive means to regulate the pulse width of the electrical energy applied to said recording element.

4. A recorder according to claim 1, wherein said carrier includes memory means for storing therein data to be recorded by said recording means.

5. A recorder according to claim 1, wherein said power source means is mounted on a stationary recorder main body.

6. A recorder according to claim 1, wherein said regulation means is mounted on a stationary recorder main body.

7. A recorder according to claim 1 wherein:
said recording means includes a plurality of said recording elements selectively enabled by said drive means, the voltage applied to said recording means being dependent on the number of said recording elements that are enabled; and said regulation means maintains the voltage applied to each said recording element substantially constant regardless of the number of said recording elements enabled.

* * * * *